(12) United States Patent
Itagaki

(10) Patent No.: US 10,754,182 B2
(45) Date of Patent: Aug. 25, 2020

(54) LIQUID CRYSTAL DISPLAY DEVICE

(71) Applicant: Japan Display Inc., Minato-ku (JP)

(72) Inventor: Yusuke Itagaki, Minato-ku (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/164,949

(22) Filed: Oct. 19, 2018

(65) Prior Publication Data
US 2019/0129232 A1   May 2, 2019

(30) Foreign Application Priority Data

Oct. 30, 2017   (JP) .................................. 2017-208881

(51) Int. Cl.
| | | |
|---|---|---|
| *G02F 1/1333* | (2006.01) | |
| *G02F 1/1335* | (2006.01) | |
| *F21V 8/00* | (2006.01) | |
| *H01L 51/52* | (2006.01) | |

(52) U.S. Cl.
CPC .. *G02F 1/133308* (2013.01); *G02F 1/133512* (2013.01); *G02B 6/0088* (2013.01); *G02F 2201/08* (2013.01); *G02F 2201/56* (2013.01); *G02F 2202/28* (2013.01); *H01L 51/524* (2013.01)

(58) Field of Classification Search
CPC .............. G02B 6/0055; B32B 2405/00; G02F 2202/28; G02F 1/0107; G02F 1/1339; G02F 1/1341; G02F 2001/133325; G02F 2001/133317; H01L 51/524; H01L 51/5246; H01J 2329/867; H01J 2329/8675; H01J 9/261
See application file for complete search history.

(56) References Cited

U.S. PATENT DOCUMENTS

| 9,811,188 B1* | 11/2017 | Subbarayan | .......... G06F 3/0412 |
| 2009/0185101 A1* | 7/2009 | Matsuhira | .............. G02F 1/1339 349/58 |
| 2010/0246163 A1* | 9/2010 | Chen | ................. G02F 1/133608 362/97.1 |

(Continued)

FOREIGN PATENT DOCUMENTS

KR          20170050719 A  *  5/2017

OTHER PUBLICATIONS

Lee, English translation for KR 2017/0050719 (Year: 2017).*

*Primary Examiner* — Michael H Caley
*Assistant Examiner* — Jonathan Y Jung
(74) *Attorney, Agent, or Firm* — Oblon, McClelland, Maier & Neustadt, L.L.P.

(57) ABSTRACT

The purpose of the invention is to realize the liquid crystal display device that has narrow frame area and light from the back light does not leak. The structure of the present invention is: A liquid crystal display device having a liquid crystal display panel and a back light comprising; the liquid crystal display panel has a first side, a second side, which crosses the first side, and a corner that connects the first side and the second side, the side surface of the liquid crystal display panel and the side surface of the back light are fixed to each other by the black resin at the first side and at the second side, a light shield film that is different from the black resin is formed on the side surface of the liquid crystal display panel and the side surface of the back light at the corner.

14 Claims, 16 Drawing Sheets

(56) References Cited

U.S. PATENT DOCUMENTS

2013/0263488 A1* 10/2013 Wu .................... G02B 6/0088
                                                          40/773
2015/0241731 A1    8/2015 Jeong et al.
2017/0274623 A1*  9/2017 Sherman ................ B32B 27/08

* cited by examiner

LIQUID CRYSTAL DISPLAY DEVICE

CLAIM OF PRIORITY

The present application claims priority from Japanese Patent Application JP 2017-208881 filed on Oct. 30, 2018, the content of which is hereby incorporated by reference into this application.

BACKGROUND OF THE INVENTION

(1) Field of the Invention

The present invention relates to a liquid crystal display device specifically the liquid crystal display device having a narrow frame, used for a smartphone or a tablet type display device and the like.

(2) Description of the Related Art

The liquid crystal display device has a TFT (Thin Film Transistor) substrate, a counter substrate opposing to the TFT substrate, and a liquid crystal layer sandwiched between the TFT substrate and the counter substrate. The TFT substrate has plural pixels arranged in matrix form; each of the pixels has a pixel electrode and a Thin Film Transistor (TFT). A transmittance of light in each of the pixels is controlled by liquid crystal molecules; thus, images are formed. Since the liquid crystal display device is flat and thin display device, the field of the application of the liquid crystal display device is expanding.

In the field of small or medium sized display devices, it is required to enlarge the display area while the outer size of the display device is kept constant; consequently a width of the frame becomes narrower. In the meantime, the liquid crystal display device is not self-illuminant; thus, the back light is necessary. Therefore, the back light is also required to have a narrow frame.

The patent document 1 (US patent application laid open No. 2015/0241731) discloses a liquid crystal display device, having a back light at the rear of the liquid crystal display panel, comprising: the back light is contained in the lower frame, the liquid crystal display panel is set on the lower frame, and the side of the lower frame and the side of the liquid crystal display panel are fixed by the adhesive.

SUMMARY OF THE INVENTION

If a narrow frame is required in the liquid crystal display device, the frame of the back light is also necessary to be narrow. The conventional back light has a resin mold that contains: a light source, a light guide, a diffusion sheet, a prism sheet, and a reflection sheet; the resin mold and the liquid crystal display panel are assembled to each other using the black adhesive sheet and the like.

The resin mold, however, has a problem of a mechanical strength when the cross sectional width is narrowed; thus, there is a limitation to realize a narrow frame if the resin mold is used. On the other hand, the back light is required not to leak a light to the outside. In addition, it is required that the back light and the liquid crystal display panel are fixed firmly to each other.

The present invention is to realize the liquid crystal display device wherein the back light has a narrow frame and a low leak of light, further, the back light and the liquid crystal display panel are securely fixed to each other.

The present invention overcomes the above explained problem; the concrete structures are as follows.

(1) A liquid crystal display device having a liquid crystal display panel and a back light comprising:

the liquid crystal display panel has a first side, a second side, which crosses the first side, and a corner that connects the first side and the second side, the side surface of the liquid crystal display panel and the side surface of the back light are fixed to each other by the black resin at the first side and at the second side, a light shield film that is different from the black resin is formed on the side surface of the liquid crystal display panel and the side surface of the back light at the corner.

(2) A liquid crystal display device having a liquid crystal display panel and a back light comprising:

the liquid crystal display panel has a first side surface, a second side surface, which crosses the first side surface, and a first corner that connects the first side surface and the second side surface, the back light has a third side surface along the first side surface and a fourth side surface along the second side surface and a second corner along the first corner, a first light shield film is formed on the first side surface or on the third side surface, a second light shield film is formed on the first corner or on the second corner, the first light shield film is thicker than the second light shield film.

DETAILED DESCRIPTION OF THE PREFERRED EMBODIMENTS

The present invention will be described in detail referring to the following embodiments.

Embodiment 1

Figure 1:
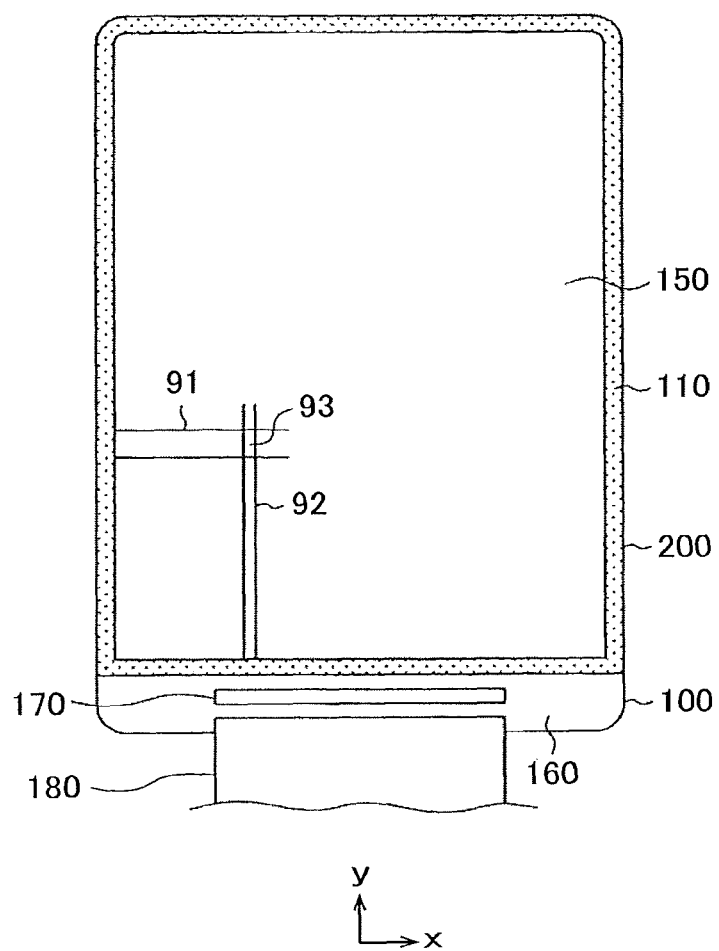
FIG. 1 is a plan view of the liquid crystal display panel.

FIG. 1 is a plan view of the liquid crystal display device 50, which the present invention is applied. In FIG. 1, the TFT substrate 100 and the counter substrate 200 are adhered to each other by the seal material 110; the liquid crystal is sealed inside. The display area 150 is formed where the TFT substrate 100 and the counter substrate 200 overlap.

The corners of the TFT substrate 100 and the counter substrate 200 are made curved or circular arced. This corresponds to that the corner of the final products of the smartphone or the tablet type display is circular arc. Namely, the long side and the short side are straight line while the corner that connects the long side and the short side is circular arc in the liquid crystal display panel.

In FIG. 1, in the display area 150, the scanning lines 91 extend in the lateral direction (x direction) and are arranged in the longitudinal direction (y direction); the video signal lines 92 extend in the longitudinal direction and are arranged in the lateral direction. The pixel 93 is formed in the area surrounded by the scanning lines 91 and the video signal lines 92.

The TFT substrate 100 is formed bigger than the counter substrate 200, the area of the TFT substrate 100 that does not overlap the counter substrate 200 is the terminal area 160. The driver IC 170, which drives the liquid crystal display device, is installed on the terminal area; the flexible wiring substrate 180, which supplies the power and the signals to the liquid crystal display device, is connected to the terminal area 160. Since the liquid crystal display panel is not a self-illuminant, the back light is disposed at the rear of the liquid crystal display panel 50.

Figure 2:
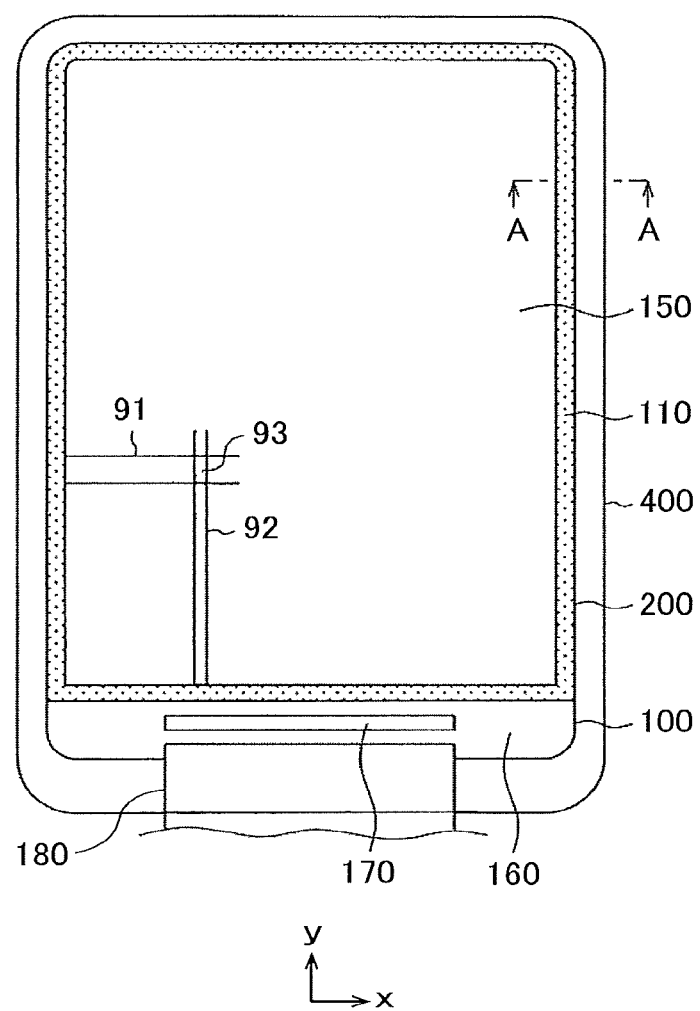
FIG. 2 is a plan view of the liquid crystal display device, in which the cover glass is disposed.

FIG. 2 is a plan view that the cover glass 400 is adhered to the upper surface of the liquid crystal display panel 50 of FIG. 1. The cover glass 400 is made bigger than the liquid crystal display panel 50. At the terminal area 160 in FIG. 2, the flexible wiring substrate 180 extends to the outside of the cover glass 400; in the final figure, however, the flexible wiring substrate 180 is bent to extend to the rear side of the cover glass 400. In the actual products, a light shield area is formed like a frame at the periphery of the cover glass 400; however, the light shield area is not shown in FIG. 2 to avoid the complexity of the figure.

Figure 3:
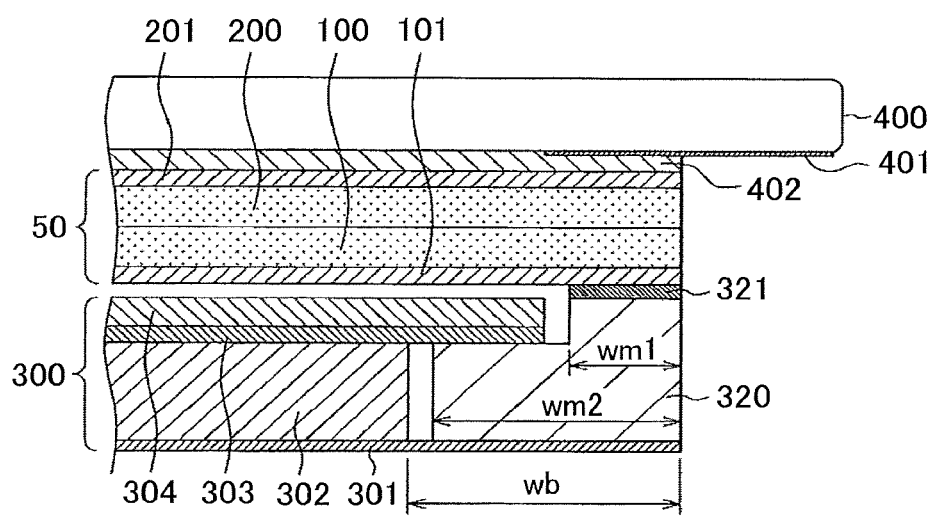
FIG. 3 is a cross sectional view along the A-A line of FIG. 2.

FIG. 3 is a cross sectional view along the line A-A of FIG. 2 in the conventional structure where the elements of the back light are contained in the resin mold 320. In FIG. 3, the cover glass 400 is adhered to the liquid crystal display panel 50 via adhesive 402. The back light 300 is disposed at the rear of the liquid crystal display panel 50; the liquid crystal display panel 50 and the back light 300 are adhered to each other via the black adhesive tape 321, which is disposed on the top of resin mold 320.

In FIG. 3, the cover glass is the thickest, which the thickness is e.g. 0.5 mm to 0.6 mm. By the way, FIG. 3 is NTS (Not To Scale); the following figures are the same. The light shield area 401 is formed on the cover glass 400 at the periphery for a design requirement and to prevent the leak of the back light from the periphery of the cover glass 400. The cover glass 400 and the liquid crystal display panel 50, more accurately speaking, the upper polarizing plate 201 of the liquid crystal display panel 50 and the cover glass 400 are adhered to each other via transparent adhesive resin 402, e.g. acrylic.

In FIG. 3, the TFT substrate 100 and the counter substrate 200 are adhered to each other; the scanning lines 91, the video signal lines 92, TFTs, the pixel electrodes, and so on are formed on the TFT substrate 100. The liquid crystal layer is sandwiched between the TFT substrate 100 and the counter substrate 200; the TFT substrate 100 and the counter substrate 200 are adhered to each other at their periphery via seal material 110; however, since the thicknesses of the liquid crustal layer and the seal material 110 are very thin, they are not shown in FIG. 3. In FIG. 3, the lower polarizing plate 101 is adhered to under the TFT substrate 100; the upper polarizing plate 201 is adhered to on the counter substrate 200. Assembly of the TFT substrate 100, the counter substrate 200, the lower polarizing plate 101 and the upper polarizing plate 201 is called the liquid crystal display panel 50.

The thicknesses of the TFT substrate 100 or the counter substrate 200 are e.g. 0.1 mm to 0.15 mm. The thicknesses of the upper polarizing plate 201 or the lower polarizing plate 101 are e.g. 0.13 mm. Therefore, the liquid crystal display panel 50 in FIG. 3 is thin.

The back light 300 is disposed on the back of the liquid crystal display panel 50. The elements of the back light are contained in the resin mold 320. The LEDs are used for the light source of the back light; however, they are not shown in FIG. 3 since they are located at the other place of the back light 300. By the way, the LEDs are generally set under the terminal area 160 in FIG. 2 in the back light.

In FIG. 3, the reflection sheet 301 is set on the lower surface of the resin mold 320. The reflection sheet 301 reflects the light from the light guide 302 to the direction of the liquid crystal display panel 50. The light guide 302 is disposed on the reflection sheet 301. The light guide 302 has a role to direct the light incident from the side surface of the light guide 302 to the side of the liquid crystal display panel 50. The light guide 302 is thickest among the components of the back light; the thickness of the light guide is e.g. 200 microns.

A group of the optical sheets are set on the light guide 302. The group of the optical sheets is comprised of the diffusion sheets 303 and the prism sheets 304. In FIG. 3, one diffusion sheet 303 and one prism sheet 304 are set; however, a combination of the optical sheets can have several variations. For example, other than the structure of FIG. 3, a group of the optical sheets can be comprised of four sheets of the lower diffusion sheet, the lower prism sheet, the upper prism sheet and the upper diffusion sheet in this order from the side of the light guide 302. The optical sheets can extend to on the lower step of the resin mold 320 to be fixed to the resin mold 320 via an adhesive. A thickness of each of the optical sheets is e.g. approximately 50 microns.

In FIG. 3, the liquid crystal display panel 50 is fixed at the top of the resin mold 320 via e.g. the black adhesive tape

321. At least, approximately 300 microns is necessary for a width wm1 of the upper step of the resin mold 320 to fix the liquid crystal display panel 50 on the resin mold 320 stably. In addition, at least, approximately 0.6 mm is necessary for a width wm2 of the resin mold 320 to stably fix the group of the optical sheets on the resin mold and to maintain a mechanical strength of the resin mold 320. The black adhesive tape 321 is adopted for the light shield. A thickness of the black adhesive tape 321 is e.g. 30 microns.

In FIG. 3, provided, an edge of the effective area of the back light 300 is the edge of the light guide 302, a width of the frame of the back light 300 is wb. The width wb can be comparatively a big value because of the existence of the resin mold 320. In FIG. 3, the light shield treatment is not applied to the side surfaces of the TFT substrate 100 and the counter substrate 200, which constitute the liquid crystal display panel 50; however, if the light shield treatment is applied to the surfaces, the frame area of the back light becomes further bigger.

Figure 4:
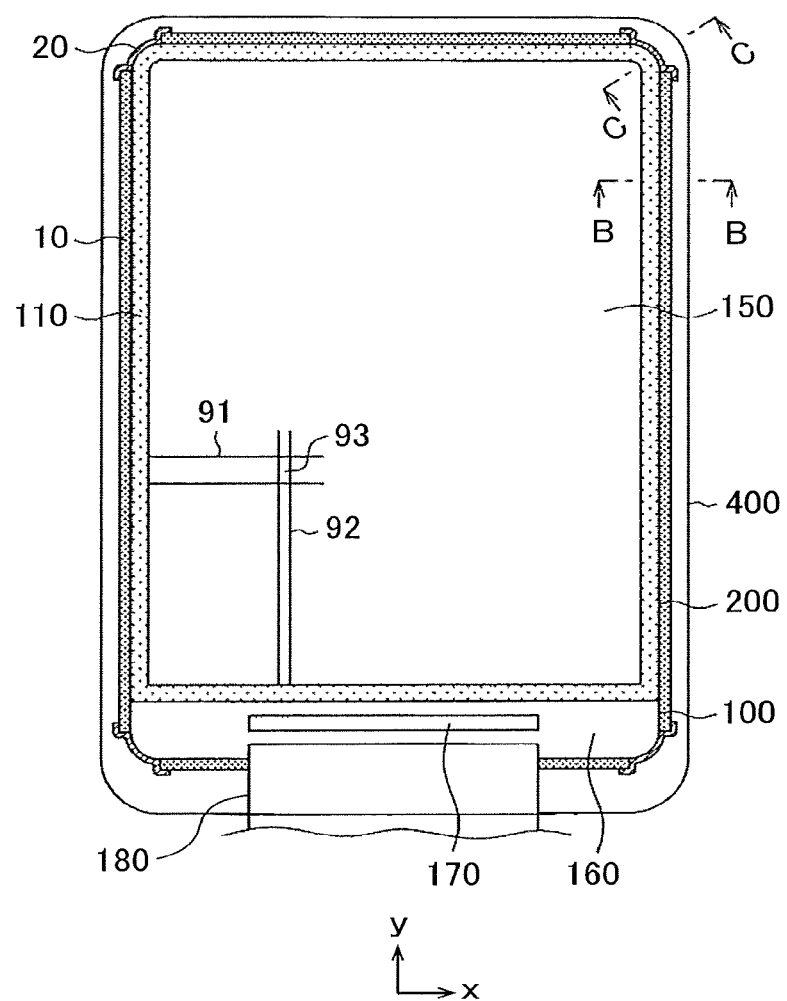
FIG. 4 is a plan view of the liquid crystal display device, in which the cover glass is disposed according to the present invention.

FIG. 4 is a plan view of the liquid crystal display device according to the present invention. In FIG. 4, which corresponds to FIG. 2, the cover glass 400 is disposed on the liquid crystal display panel 50. The back light 300 is disposed on the back of the liquid crystal display panel 50. The structure of the liquid crystal display panel 50 is the same as the structure explained in FIG. 2. The cover glass 400 is, too, the same as the one explained in FIG. 2. The characteristics of FIG. 4 are that the liquid crystal display panel 50 and the back light 300 are fixed by the moisture curable black resin 10 (herein after hot melt resin 10), which is coated on the side surfaces of the liquid crystal display panel 50 and the back light 300. The reason why the hot melt black resin 10 is used is to prevent the leak of light from the side surfaces of the liquid crystal display panel 50 and the back light 300. Herein after hot melt black resin is simply called the hot melt resin in this specification.

In FIG. 4, the hot melt resin 10 is formed on the side surfaces of the long sides and the short sides. The hot melt resin 10 is a thermoplastic resin, which is liquidized when it is heated to be 90 centigrade to 100 centigrade. The hot melt resin 10 is coated on the side surfaces of the liquid crystal display panel 50 and the back light 300 simultaneously with dispenser 60, so called the hot gun, which has a heater inside. There are several kinds of hot melt resin 10; among them, the resin that cures by absorbing moisture in the air is used in this embodiment.

Since the hot melt resin 10 is coated with a hot gun on the side surfaces of the liquid crystal display panel 50 and the back light 300, it is difficult to coat uniformly all around the side surfaces in a mass production. It is specifically difficult to coat at the corners of the liquid crystal display panel 50 and the back light 300. The hot melt resin 10 has a role to prevent a leak of light from the liquid crystal display panel 50 and the back light 300; therefore, if there exists a portion that the hot melt resin 10 is not coated, the leak of light occurs at this portion.

The present invention countermeasures this problem by coating the oil based black ink 20 at the side surface of the corner to prevent the leak of light. The oil based ink 20, which uses volatile organic solvent as the solvent, dries quickly, is easily coated even on the metals, in addition, and has a big adhesive strength. The oil based black ink, which is used in e.g. the ball point pen, has a good workability; therefore, it is easily coated on the side surfaces of the corners of the liquid crystal display panel 50 and the back light 300.

Figure 5:
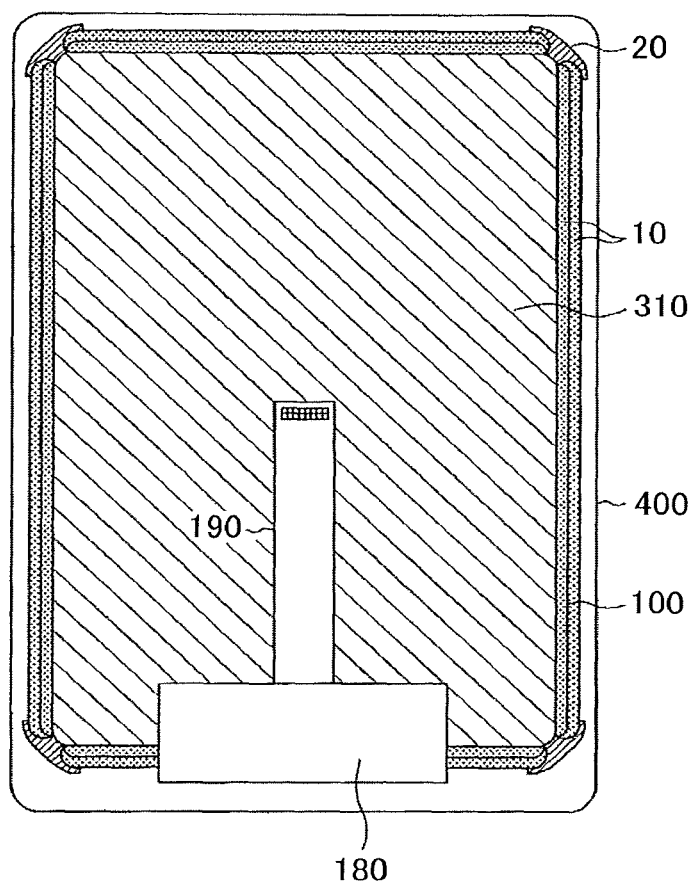
FIG. 5 is a rear view of the liquid crystal display device according to the present invention.

FIG. 5 is a rear view of FIG. 4. In FIG. 5, although the liquid crystal display panel 50 is adhered to the cover glass 400, it is not visible, since it is covered by the back light 300 and the hot melt 10 from the back in FIG. 5. The major portion of FIG. 5 is the bottom of the metal frame 310. The flexible wiring substrate 180 from the liquid crystal display panel 50 is folded back to the rear surface of the metal frame 310. The connector 190 is connected to the flexible wiring substrate 180.

In FIG. 5, the hot melt resin 10 is formed on the side surface of the metal frame 310 and the side surface of the liquid crystal display panel 50 to fix the metal frame 310 and the liquid crystal display panel 50. The black ink 20 is formed on the side surfaces of the corners 20 of the liquid crystal display panel 50 and the metal frame 310 to prevent the leak of light at the place where the hot melt resin 10 is not formed.

Figure 6:
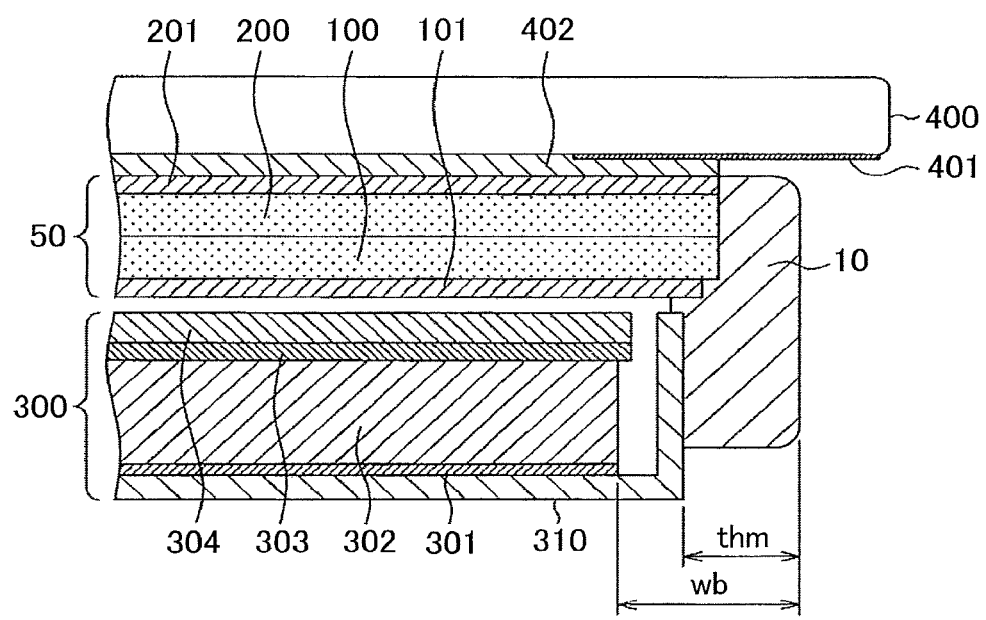
FIG. 6 is a cross sectional view along the B-B line of FIG. 4.

FIG. 6 is a cross sectional view along the B-B line of FIG. 4. In FIG. 6, the structure of the liquid crystal display panel 50 and the cover glass 400 is the same as the structure explained in FIG. 3. The characteristics of FIG. 6 are the structure of the back light 300 and the means to fix the liquid crystal display panel 50 and the back light 300 together. In FIG. 6, the reflection sheet 301, the light guide 302, the diffusion sheet 303, the prism sheet 304 and so on are contained in the metal frame 310, which is made of Al and the like. Since the metal frame 310 has a good workability and strength, the thickness can be as thin as 0.1 mm to 0.15 mm. Furthermore, since the metal frame 310 is formed box like, the mechanical strength can be easily acquired.

In FIG. 6, the hot melt resin 10 is formed on the side surface of the metal frame 310 and the side surface of the liquid crystal display panel 50 to fix the metal frame 310 and the liquid crystal display panel 50 together. In the meantime, in FIG. 6, there exists a space between the lower polarizing plate 101 of the liquid crystal display panel 50 and the optical sheets, e.g. the prism sheet 304 of the back light 300 to prevent a generation of the Newton ring; this space is also maintained by the hot melt resin 10.

The hot melt resin 10 is coated on the side surface of the liquid crystal display panel 50 and the side surface of the back light 300 simultaneously with dispenser 60, so called the hot gun, which has a heater inside. The viscosity of the hot melt resin 10 when it is coated at 100° C. is e.g. 2000 to 10000 mPa sec (milli Pascal times second), more preferably 3000 to 10000 mPa sec. If the viscosity is too high, it deteriorates the workability, while if the viscosity is too low, there occurs a danger that the hot melt resin 10 intrudes into the space of the back light 300 through the space between the liquid crystal display panel 50 and the back light 300. An example of the suitable hot melt resin 10 for the present invention is #3573 of Henkel Ltd.

Figure 7:
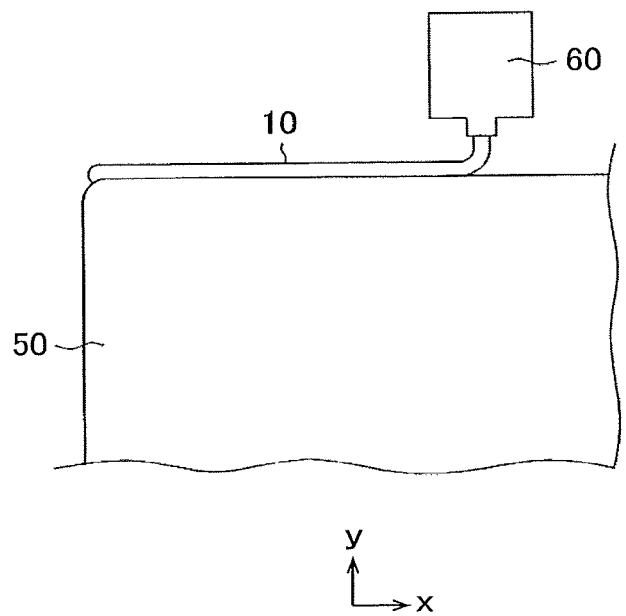
FIG. 7 is a schematic view that the hot melt resin is being coated on the side surface of the liquid crystal display panel.

FIG. 7 is a schematic view that the hot melt resin 10 is coated on the side surface of the liquid crystal display panel 50. In FIG. 7, since the back light 300 is disposed on the back of the liquid crystal display panel 50, the hot melt resin 10 is coated on the side surface of the back light 300 simultaneously. The coating surface in FIG. 7 is the side surface of the long side of the liquid crystal display panel 50; when the coating is completed on this side, the liquid crystal display panel 50 and the back light 300 are rotated 90 degree; then the side surface of the short side is coated by the hot melt resin 10. Such a coating is made for four side surfaces of the liquid crystal display panel 50 and the back light 300.

Figure 8:
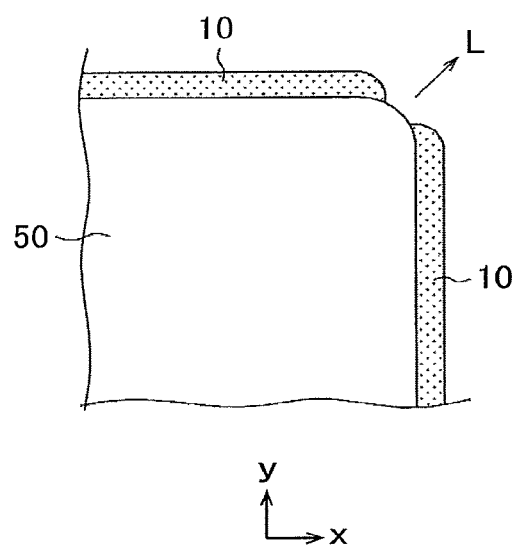
FIG. 8 is a plan view at the corner of the liquid crystal display panel, in which the hot melt resin is coated.

Since the long side and the short side are straight lines in general, the coating of the hot melt resin 10 can be made as depicted in FIG. 7. However, the coating at the side surfaces of the corners of the liquid crystal display panel 50 and the back light 300 is a problem. FIG. 8 is a schematic plan view that the hot melt resin 10 is not thoroughly coated at the corner. The hot melt resin 10 is black resin, which has a role as the light shield. If there exists a portion that the hot melt resin 10 is not coated, the light from the back light leaks from this portion as denoted L in FIG. 8.

Some light is emitted from the side surfaces of the TFT substrate 100 or the counter substrate 200 after repeating the total reflections in the substrates in the liquid crystal display panel 50. Further, since there is a space between the metal frame 310 of the back light 300 and the liquid crystal display panel 50 as depicted in FIG. 6, the light is emitted to the outside from this space if the hot melt black resin 10 does not exist in the space. The light released from the space between the back light 300 and the liquid crystal display panel 50 goes to the screen side repeating reflections; thus, visibility of the screen is deteriorated.

Figure 9:
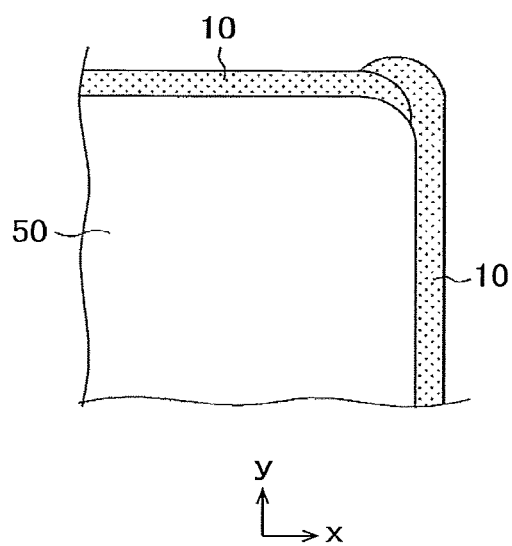
FIG. 9 is a plan view at the corner of the liquid crystal display panel, in which the hot melt resin layers are coated in overlapping.
Figure 10:
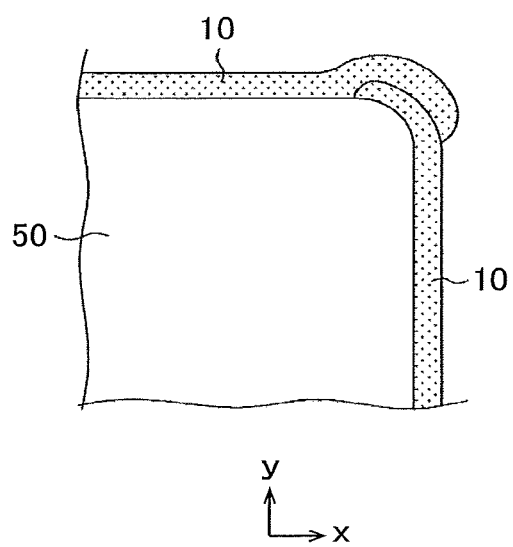
FIG. 10 is a plan view at the corner of the liquid crystal display panel of another example, in which the hot melt resin layers are coated in overlapping.

FIGS. 9 and 10 are schematic pan views that show the hot melt resin 10 is coated abundantly at the corner so that non coating area does not generated at the corner. FIG. 9 is a plan view that the hot melt resin 10 is coated first on the side parallel to the x axis, while FIG. 10 is a plan view that the hot melt resin 10 is coated first on the side parallel to the y axis. In the cases of FIGS. 9 and 10, the hot melt resin 10 is coated in double at the corners. Since a thickness of the hot melt resin 10 is approximately 200 microns, the thickness of the hot melt resin 10 at the corner becomes 400 microns. Consequently, the hot melt resin 10 at the corner is thicker than other places, thus, a problem can occur when the liquid crystal display device is being inserted in the set as e.g. the smartphone or the tablet type display device.

The present invention counter measures this problem by not making the hot melt resin 10 thick at the corner, but the oil based black ink 20 is formed at the place where the hot melt resin 10 is not coated. Since the oil based black ink 20 is not necessary to be coated thick, it can be coated in lamination with the hot melt resin 10; consequently, the leak of light can be securely prevented.

Figure 11:
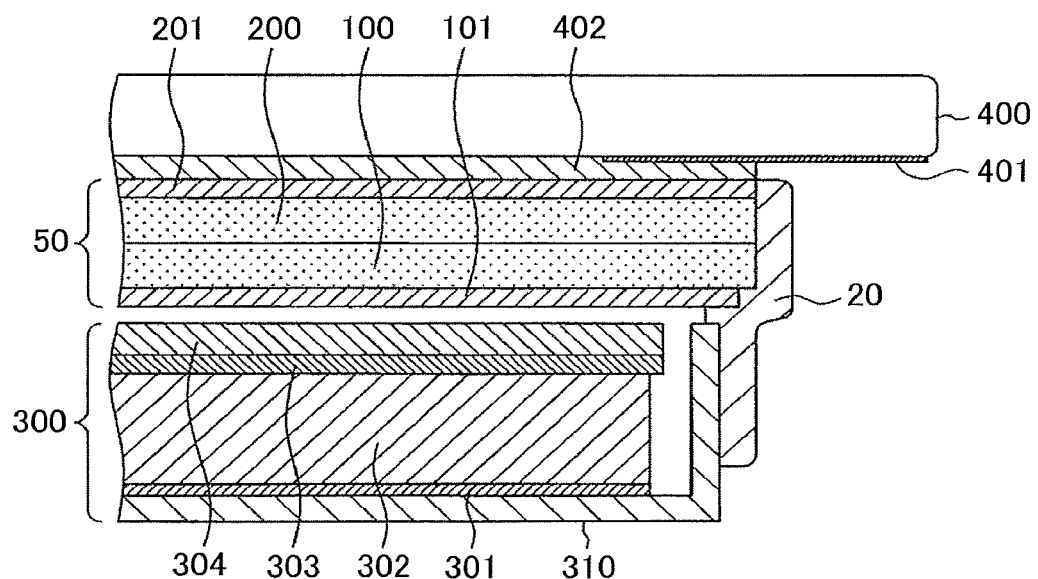
FIG. 11 is a cross sectional view along the C-C line of FIG. 4.

FIG. 11 is a cross sectional view along the line C-C of FIG. 4. The structure of the cover glass 400, the liquid crystal display panel 50, and the back light 300 is the same as the structure explained in FIG. 6. FIG. 10 differs from FIG. 6 in that: the oil based black ink 20, not the hot melt resin 10, is formed at the portion where the hot melt resin 10 is not coated on the side surfaces of the liquid crystal display panel 50 and the metal frame 310 of the back light 300, and at the space between the liquid crystal display panel 50 and the metal frame 310.

The black ink is the substance that pigments as e.g. carbon black, graphite, or organic pigment are dispersed in the solvent as e.g. ketone, alcohol, ethyl acetate. The purpose of the application of the black ink 20 is a light shield to prevent the light of the back light from leaking to the outside, not fixing the liquid crystal display panel 50 and the back light 300 together; therefore, the mechanical strength to combine the liquid crystal display panel 50 and the back light 300 is not necessary.

The black ink 20, however, needs to fill the space between the liquid crystal display panel 50 and the metal frame 310 of the back light 300; thus, it is preferable to be coated in a certain thickness of several microns to several tens of microns; therefore, the black ink 20 needs to have certain viscosity. In addition, if the viscosity of the black ink 20 is too low, it penetrates into the inside of the back light 300. Considering the above requirements, the viscosity of the black ink 20 is e.g. 1000 to 10000 mPa sec (milli Pascal times second), more preferably 1000 to 3000 mPa sec. The oil based ink is suitable to manufacturing such a high viscosity ink. Herein after, the black ink is called as the oil based black ink 20.

In FIG. 11, a thickness of the oil based black ink 20 is e.g. 10 microns. The side surface of the liquid crystal display panel 50 is coated by the oil based black ink 20; the space between the metal frame 310 and the liquid crystal display panel 50 is filled with the oil based black ink 20; thus, the light from the back light 300 does not leak from the liquid crystal display panel 50 and the metal frame 310.

Figure 12:
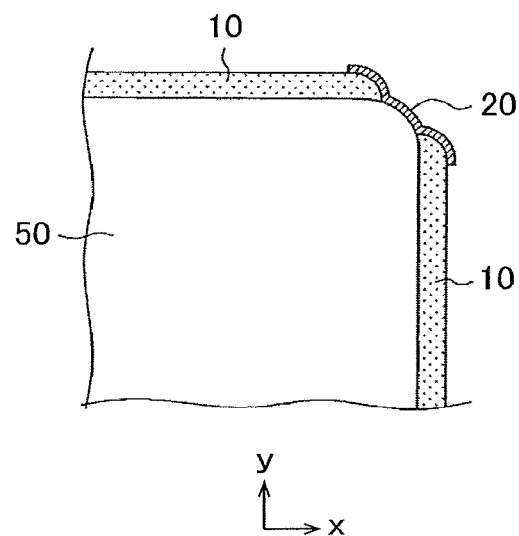
FIG. 12 is a plan view at the corner of the liquid crystal display panel, in which the oil based black ink is coated at the corner.

FIG. 12 is a plan view of the liquid crystal display panel 50 in that the oil based black ink 20 is coated on the corner after the hot melt resin 10 is coated. In FIG. 12, the back light 300 is disposed on the back of the liquid crystal display panel 50. According to the structure of FIG. 12, the oil based black ink 20 can be securely coated on the place where the hot melt resin 10 is not coated.

Figure 13:
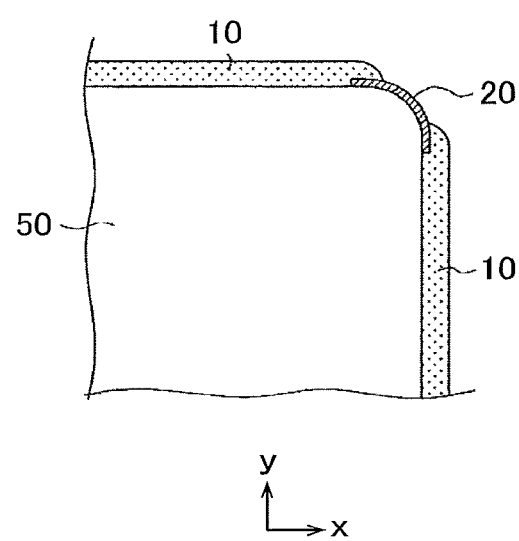
FIG. 13 is a plan view at the corner of the liquid crystal display panel of another example, in which the oil based black ink is coated at the corner.

FIG. 13 is a plan view of the liquid crystal display panel 50 in that the oil based black ink 20 is coated in advance at the place where the hot melt resin 10 is difficult to coat. Such a process can be mechanically conducted without a decision of the human beings; thus, the structure of FIG. 13 is suitable for a mass production. Furthermore, since the thin oil based black ink 20 is coated in advance to the coating of thick hot melt resin 10, a step disconnection of the oil based black ink 20, which causes a leak of light, does not occur.

There are portions where the hot melt resin 10 and the oil based black ink 20 are laminated in FIGS. 12 and 13. However, the oil based black ink 20, whose thickness is approximately 10 microns, is much thinner than the thickness of the hot melt resin 10; thus, the laminated portion does not raise a problem for inserting the liquid crystal display device into the set.

In the meantime, a black tape can be used instead of the oil based black ink 20.

Embodiment 2

The feature of the present invention is to assemble the liquid crystal display panel 50 and the back light 300 by coating the hot melt resin 10 at both of the side surface of the liquid crystal display panel 50 and the side surface of the back light 300. In the meantime, the liquid crystal display panel 50, itself, has a manufacturing tolerance; and the back light 300, itself, has a manufacturing tolerance. In addition, there is a tolerance in assembling the liquid crystal display panel 50 and the back light 300. Further, there is a variation in the amount of discharge of the hot melt resin 10 for the assembly.

Figure 14:
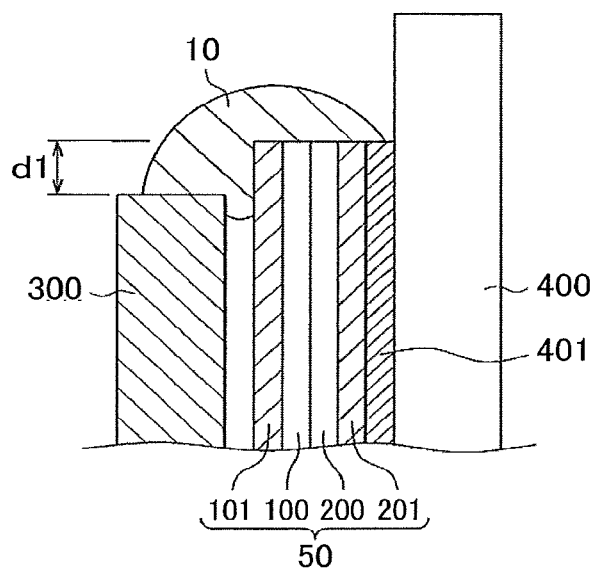
FIG. 14 is a cross sectional view of the liquid crystal display device of standard structure when the hot melt resin is formed.

FIG. 14 is a cross sectional view along the line B-B of FIG. 4. In FIG. 14, the edge of the back light 300 recesses to inside by an amount of d1 from the edge of the liquid crystal display panel 50. The discharge amount of the hot melt resin 10 is premised as a standard amount in FIG. 14. In this case, the side surface of the liquid crystal display panel 50 is coated by the hot melt resin 10, which is a black resin; thus, the light does not leak to the outside.

Figure 15:
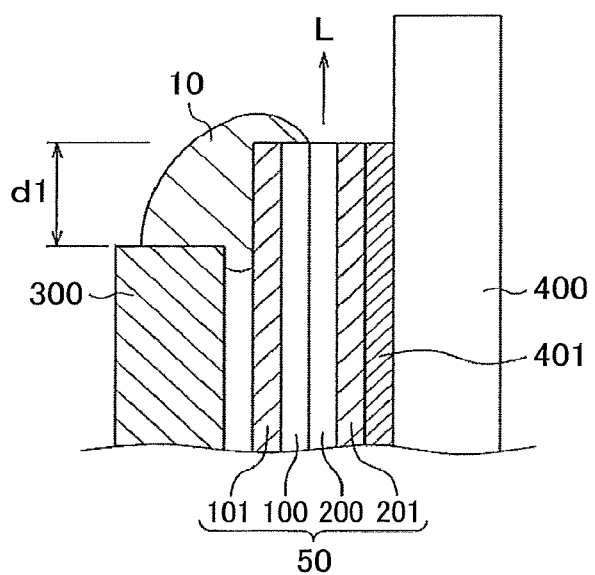
FIG. 15 is a cross sectional view that shows one problem when the hot melt resin is formed.

FIG. 15 is a cross sectional view that the amount of d1, which is a recess of the edge of the back light 300 from the edge of the liquid crystal display panel 50, is bigger compared with the structure of FIG. 14 due to tolerances of the components and the assembling of the components. In FIG. 15, in addition to that, the discharge amount of the hot melt resin 10 is a little bit less than the case of FIG. 14. In such a case there is a chance that the hot melt resin 10 does not thoroughly cover the side surface of the liquid crystal display panel 50. Therefore, at this portion, the light as denoted by L in FIG. 15 leaks from the counter substrate 200 and the like of the liquid crystal display panel 50.

Figure 16:
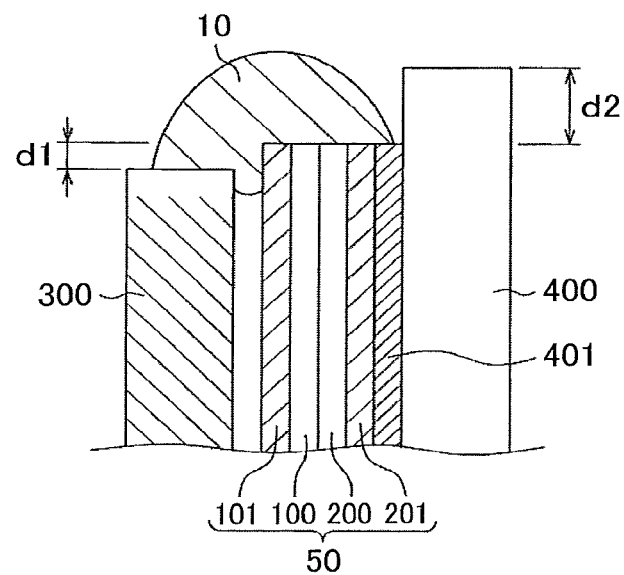
FIG. 16 is a cross sectional view that shows another problem when the hot melt resin is formed.

In order to prevent such a phenomenon, it is considered to coat a relatively larger amount of the hot melt resin 10 in advance. In this case, however, there arises a problem depicted in FIG. 16. FIG. 16 is a cross sectional view, in which the amount of d1, which is a recess of the edge of the back light 300 from the edge of the liquid crystal display panel 50, is less compared with the structure of FIG. 14 due to the tolerances of the components and the tolerance of the assembly. In addition, the discharge amount of the hot melt resin 10 in FIG. 16 is greater than that in FIG. 14. Further, the distance d1 between the edge of the cover glass 400 and the edge of the liquid crystal display panel 50 is smaller in FIG. 16 than that in FIG. 14 due to the tolerances of the components and the tolerance of the assembly. The structure of FIG. 16 can cause a problem in installing the liquid crystal display device 50 into the final products as the smartphone or the tablet type display device, or the like.

Figure 17:
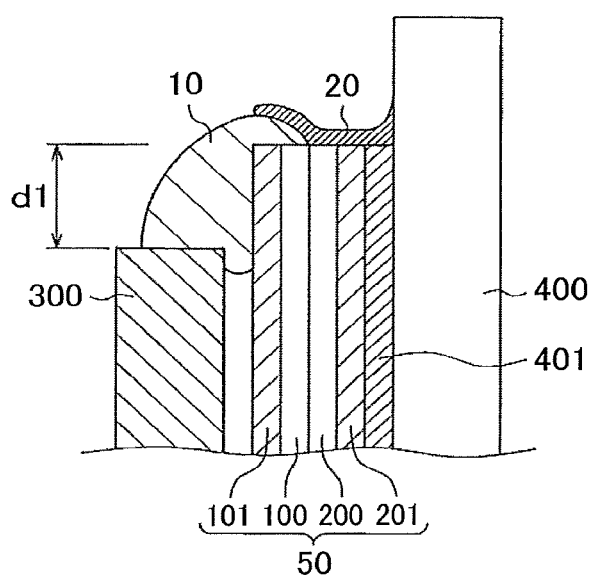
FIG. 17 is a cross sectional view of the embodiment 2.

FIG. 17 is a cross sectional view according to the embodiment 2 of the present invention that countermeasures the above explained problem. FIG. 17 is a cross sectional view that the amount of d1, which is a recess of the edge of the back light 300 from the edge of the liquid crystal display panel 50, is bigger compared with the structure of FIG. 14 due to tolerances of the components and the assemblies of the components. As a result, there exists a part in the side surface of the edge of the liquid crystal display panel 50 that is not covered by the hot melt resin 10.

In the embodiment 2, as depicted in FIG. 17, the oil based black ink 20 is coated at the place where the hot melt resin 10 is not coated. In FIG. 17, it is the hot melt resin 10 that fixes the liquid crystal display panel 50 and the back light 300; the oil based black ink 20 has a role only as a light shield film. The oil based black ink 20 is coated superposing with the hot melt resin 10; however, since the oil based black ink 20 is much thinner compared with a thickness of the hot melt resin 10, it does not raise a problem in assembling process to insert the liquid crystal display device into the set.

Figure 18:
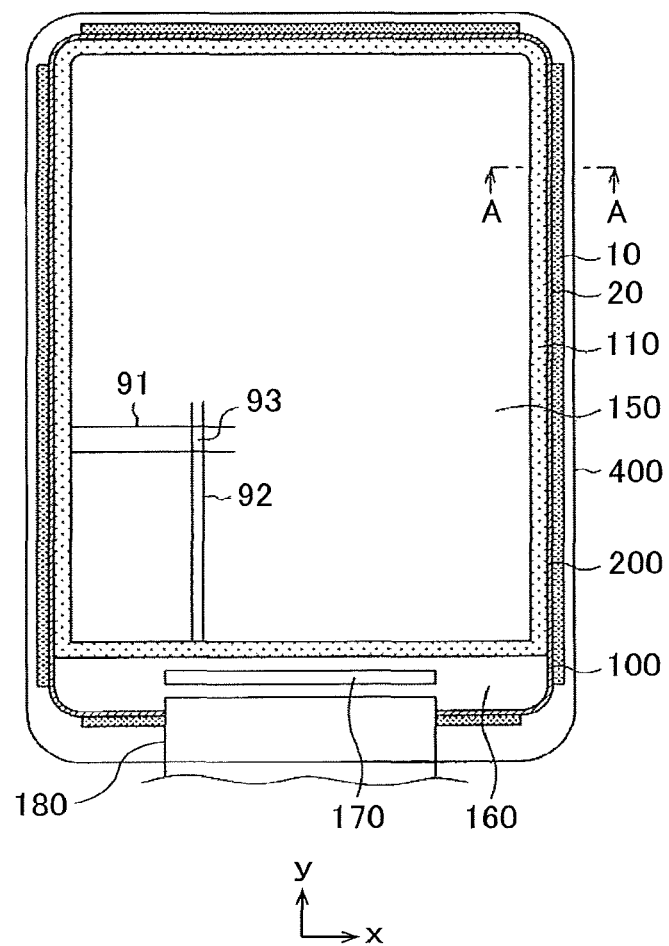
FIG. 18 is a plan view of the liquid crystal display device corresponding to FIG. 17.

FIG. 18 is a plan view that corresponds to the structure of FIG. 17. FIG. 18 differs from FIG. 4 in that the oil based black ink 20 is formed all around the side surface of the liquid crystal display panel 50 and the hot melt resin 10 is formed at the side surfaces of the long sides and the side surfaces of the short sides. In FIG. 18, the oil based black ink 20 is shown inside of the hot melt 10 since the oil based black ink 20 is coated nearer to the screen of the liquid crystal display panel 50.

In FIGS. 17 and 18, the hot melt resin 10 is coated first, after that the oil based black ink 20 is coated. The oil based black ink 20 can be coated all around the side surface of the liquid crystal display panel 50 or only the parts that the hot melt resin 10 does not cover; however, the oil based black ink 20 is indispensable at the corner since the hot melt resin 10 is difficult to coat at the corner.

Figure 19:
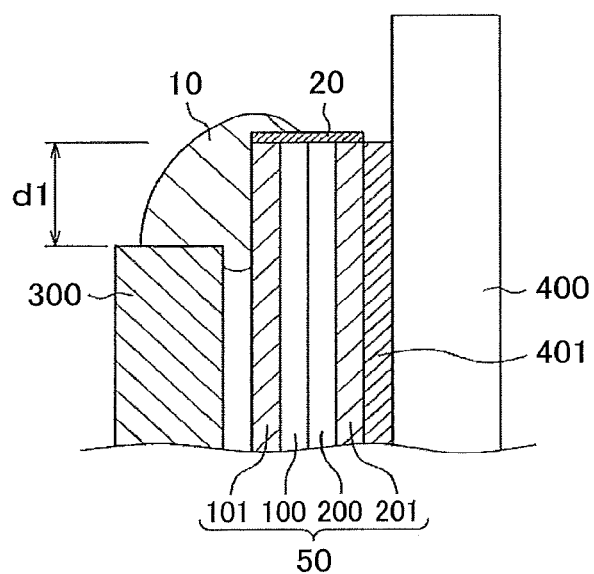
FIG. 19 is a cross sectional view of another example of the embodiment 2.

FIG. 19 is a cross sectional view that the oil based black ink 20 is coated first, after that, the hot melt resin 10 is coated. In FIG. 19, both of the oil based black ink 20 and the hot melt resin 10 works as the light shield at the side surface of the liquid crystal display panel 50. Since the oil based black ink 20 is, compared with the hot melt resin 10, flexible in viscosity and in the coating method, it can be coated at the side surface of the corners. A plan view corresponding to FIG. 19 is the same as FIG. 18.

Embodiment 3

Figure 20:
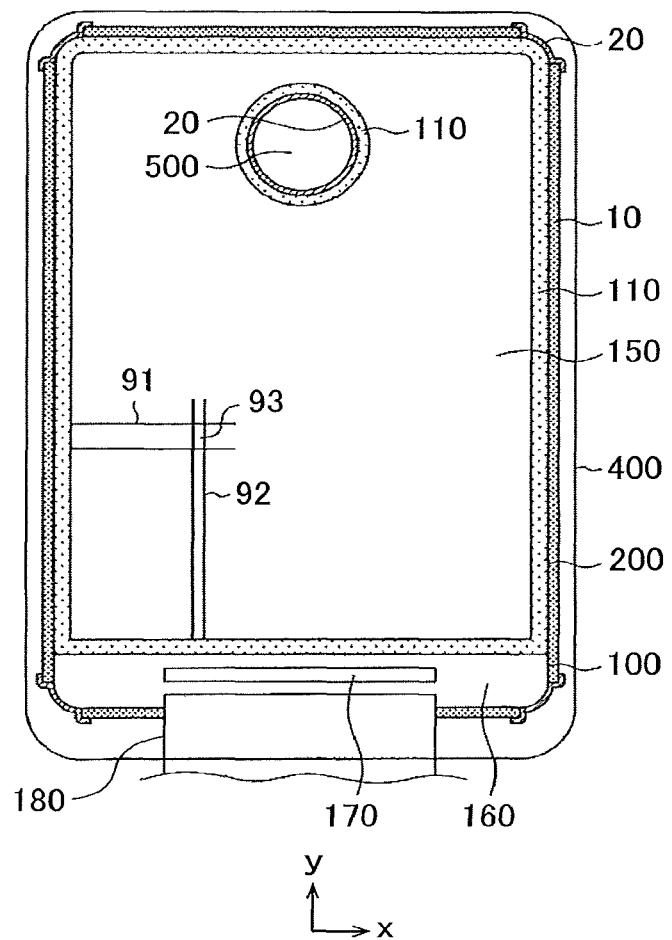
FIG. 20 is a plan view of the liquid crystal display device according to one example of the embodiment 3.

FIG. 20 is a plan view of the liquid crystal display panel 50, which the circular hole 500 is formed in the display area 150. The seal material 110 is formed circularly along the edge of the hole 500 to seal the liquid crystal. In FIG. 20, the oil based black ink 20 is coated along the inner circumference of the hole 500 to prevent the leak of light from the inner edge of the hole 500. Other structures in FIG. 20 are the same as the structures of FIG. 4.

It is technically difficult to coat the hot melt resin 10 at the inner circumference of the hole 500 of FIG. 20. On the contrary, in the oil based black ink 20, the viscosity and means of coating can be changed flexibly, thus, it can be coated at the place like inner circumference of the hole 500.

Figure 21:
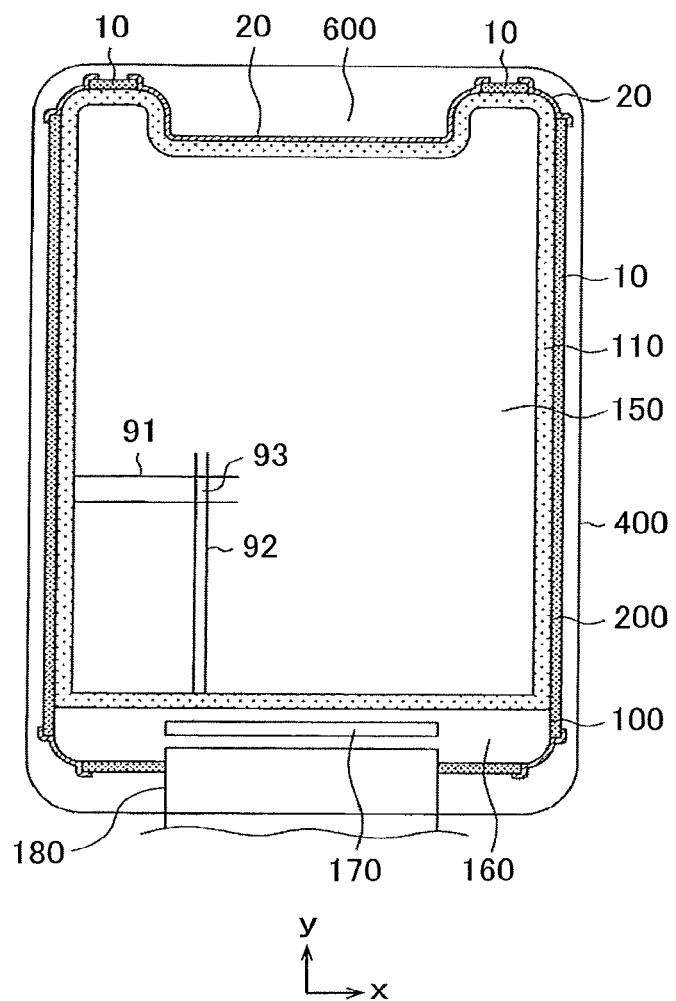
FIG. 21 is a plan view of the liquid crystal display device according to another example of the embodiment 3.

FIG. 21 is a plan view that the cut out 600 is formed in the short side toward the display area 150 in the liquid crystal display panel 50. The oil based black ink 20 is coated along the cut out 600 to prevent a leak of light from the side surfaces of the TFT substrate 100 or the counter substrate 200 at the cut out 600. In FIG. 21, even in the short side where the cut out 600 exists the hot melt resin 10 is formed at the portion other than the cut out 600 for fixing the liquid crystal display panel 50 and the back light 300 together. Other structures of FIG. 21 are the same as FIG. 4.

It is technically difficult to coat the hot melt resin 10 at the inner circumference of the cut out 600 of FIG. 21. On the contrary, in the oil based black ink 20, the viscosity and means of coating can be changed flexibly, thus, it can be coated at the place like inner circumference of the cut out 600.

FIG. 20 and FIG. 21 are examples of a deformed display panel; the present invention can be applied to other deformed display panels.

In the meantime, it may be even it is technically difficult to coat the hot melt resin 10 on the side surface inside of the cut out 600; however, if the hot melt resin 10 can be coated in a part of the cut out 600, the strength to fix the liquid crystal display panel 50 and the back light 300 together in the cut out 600 can be improved.

What is claimed is:

1. A liquid crystal display device having a liquid crystal display panel and a back light comprising:
   the liquid crystal display panel has a first side, a second side, which crosses the first side, and a corner that connects the first side and the second side,
   a side surface of the liquid crystal display panel and a side surface of the back light are fixed to each other by a black resin at the first side and at the second side,
   the black resin is not formed on the side surface of the liquid crystal display panel and the side surface of the back light at an interval at the corner,
   a light shield film that is different from the black resin is formed on the side surface of the liquid crystal display panel and the side surface of the back light at the interval, and
   the black resin is thicker than the light shield film.

2. The display device according to claim 1,
   wherein the black resin and the light shield film are formed in overlapping except at the interval.

3. The display device according to claim 1,
   wherein the black resin and the light shield film are formed in partly overlapping except at the interval.

4. The display device according to claim 2,
wherein the light shield film is formed to cover the black resin.

5. The display device according to claim 2,
wherein the black resin is formed to cover the light shield film.

6. The display device according to claim 1,
wherein the light shield film is a black ink.

7. The display device according to claim 1,
wherein the back light includes a metal frame,
a side surface of the metal frame and the side surface of the liquid crystal display panel are fixed by the black resin.

8. A liquid crystal display device having a liquid crystal display panel and a back light comprising:
the liquid crystal display panel has a first side surface, a second side surface, which cross the first side surface, and a first corner surface that connects the first side surface and the second side surface,
the back light has a third side surface along the first side surface and a fourth side surface along the second side surface and a second corner surface along the first corner surface,
a first light shield film is formed on the first side surface and on the third side surface continuously, and on the second side surface and on the fourth side surface continuously,
the first light shield film is not formed at an interval in the first corner surface and in the second corner surface,
a second light shield film is formed at the interval in the first corner surface and in the second corner surface,
the first light shield film is thicker than the second light shield film.

9. The display device according to claim 8,
wherein the first light shield film and the second light shield film are formed in partly overlapping except at the interval.

10. The display device according to claim 9,
wherein the second light shield film is formed to partly cover the first light shield film except at the interval.

11. The display device according to claim 9,
wherein the first light shield film is formed to partly cover the second light shield film except at the interval.

12. The display device according to claim 8,
wherein the first light shield film is formed by hot melt resin.

13. The display device according to claim 8,
wherein the second light shield film is formed by oil based black ink.

14. The display device according to claim 12,
wherein the back light includes a metal frame,
the side surface of the metal frame and the side surface of the liquid crystal display panel are fixed by the hot melt resin.

* * * * *